(12) United States Patent
Ooba

(10) Patent No.: US 10,549,425 B2
(45) Date of Patent: Feb. 4, 2020

(54) CARRIER DEVICE FOR TAKING OUT OBJECTS ONE BY ONE BY OPTIMAL ROUTE

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 217 days.

(21) Appl. No.: 15/709,613

(22) Filed: Sep. 20, 2017

(65) Prior Publication Data

US 2018/0085922 A1 Mar. 29, 2018

(30) Foreign Application Priority Data

Sep. 28, 2016 (JP) ................. 2016-190332

(51) Int. Cl.
| | | |
|---|---|---|
| *B25J 9/16* | (2006.01) | |
| *B25J 9/00* | (2006.01) | |
| *B25J 15/10* | (2006.01) | |

(52) U.S. Cl.
CPC .......... *B25J 9/1664* (2013.01); *B25J 9/0093* (2013.01); *B25J 9/1615* (2013.01); *B25J 9/1669* (2013.01); *B25J 9/1697* (2013.01); *B25J 15/10* (2013.01); *G05B 2219/37555* (2013.01); *G05B 2219/39486* (2013.01); *G05B 2219/40053* (2013.01); *G05B 2219/45063* (2013.01)

(58) Field of Classification Search
CPC ............. B07C 2501/0063; B25J 9/0093; B25J 9/1615; B25J 9/1664; B25J 9/1669; B25J 9/1679; B25J 9/1697; B25J 15/10; B65G 2203/0225; B65G 2203/0233; B65G 61/00; G05B 2219/37555; G05B 2219/39106; G05B 2219/39486; G05B 2219/40007; G05B 2219/40053; G05B 2219/45063; G06T 7/70; Y02P 20/083
See application file for complete search history.

(56) References Cited

U.S. PATENT DOCUMENTS

| | | | | |
|---|---|---|---|---|
| 2003/0037515 A1* | 2/2003 | Herzog | ................... | B65B 5/105 53/473 |
| 2011/0082586 A1* | 4/2011 | Nishihara | .............. | B25J 9/0093 700/259 |
| 2015/0127148 A1* | 5/2015 | Koyanagi | .............. | B25J 9/0084 700/248 |

FOREIGN PATENT DOCUMENTS

| | | |
|---|---|---|
| JP | 2002-113678 A | 4/2002 |
| JP | 2014-104524 A | 6/2014 |

* cited by examiner

*Primary Examiner* — Dale Moyer
(74) *Attorney, Agent, or Firm* — Hauptman Ham, LLP

(57) ABSTRACT

A carrier device includes a conveyor configured to carry objects supplied continuously; an object detection unit configured to detect the positions and orientations of the objects disposed in a predetermined area on the conveyor; a combination calculation unit, when a robot grasps multiple objects, out of the objects, with a hand and places the grasped objects in a container, configured to calculate combinations of sequences to grasp the objects by the hand; an index calculation unit configured to calculate an index for each combination using the distances and rotation amounts between the objects to be grasped by the hand based on the positions and orientations of the objects; and a robot control unit configured to determine the sequences to grasp the objects by the hand based on the indexes, and grasping the objects and placing the objects in the containers in accordance with the determined sequences.

4 Claims, 5 Drawing Sheets

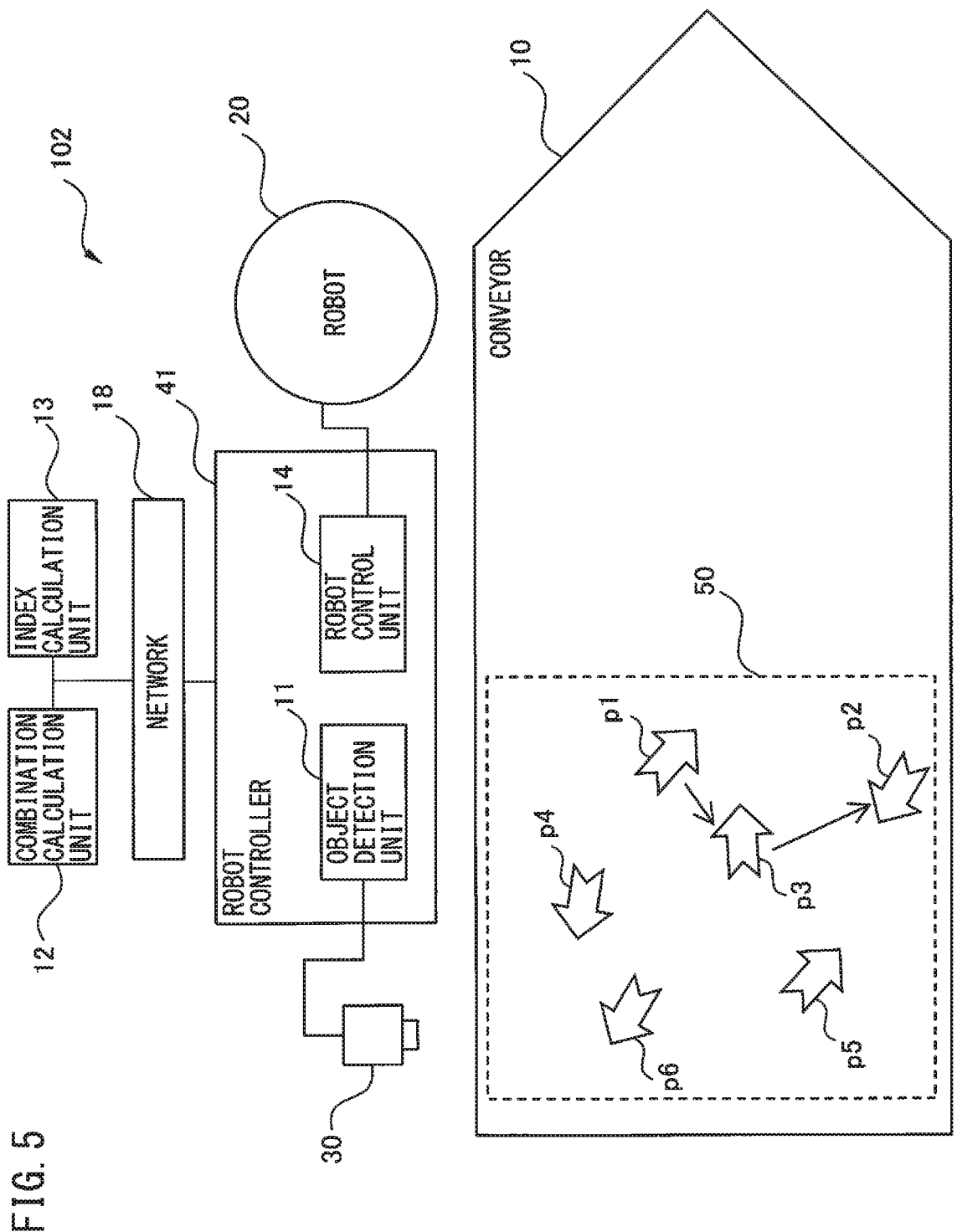

CARRIER DEVICE FOR TAKING OUT OBJECTS ONE BY ONE BY OPTIMAL ROUTE

This application is a new U.S. patent application that claims benefit of JP 2016-190332 filed on Sep. 28, 2016, the content of 2016-190332 is incorporated herein by reference.

BACKGROUND OF THE INVENTION

1. Field of the Invention

The present invention relates to a carrier device for taking out carried objects, and more specifically relates to a carrier device that takes out a plurality of objects one by one by an optimal route.

2. Description of Related Art

Object carrier systems that sequentially grasp objects carried by a conveyor one by one with a hand (multi-fingered hand) that can hold multiple objects, and place the objects in containers similarly carried by another conveyor are known. Conventionally, when grasping and taking out the objects, the objects are basically grasped in the order in which the objects are located downstream of the conveyor.

For example, there is proposed a method in which a conveyor is divided in two along a conveying direction of objects, and the objects are grasped and placed in containers in the order in which the objects are located downstream thereof (for example, Japanese Unexamined Patent Publication (Kokai) No. JP 2014-104524, hereinafter referred to as "Patent Document 1").

FIG. 1 shows a conventional method for grasping a plurality of objects (a1 to a3 and b1 to b3) disposed on a conveyor 10 with a hand (not shown) provided in a robot 20, and placing the objects in containers (not shown). The objects are disposed on a plane of the conveyor 10 in random orientations (postures), as indicated by arrows of the objects (a1 to a3 and b1 to b3).

The hand has the functions of grasping three objects and placing the objects in a container. When the conveyor 10 moves from the left to the right of FIG. 1, the objects are located downstream of the conveyor 10 in order of a1, a2, and a3. Thus, the hand grasps the objects a1, a2, and a3 in this order and places the objects in a container, and thereafter grasps the objects b1, b2, and b3 in this order and places the objects in another container.

Conventionally, since the objects are grasped in the order in which the objects are located downstream, the hand may move back and forth, as indicated by arrows in FIG. 1.

In addition, since the orientations of the objects are not considered, the hand of the robot 20 may rotate largely, as shown in FIG. 1. For example, since the objects a1 and a3 have similar orientations, the hand rotates minimally when grasping the objects in order of a1, a3, and a2. However, since the hand grasps the objects in the order in which the objects are located downstream, the hand grasps the objects in order of a1, a2, and a3, as shown in FIG. 1. As a result, after having grasped the object a1, the hand of the robot 20 rotates about 180 degrees to grasp the object a2, and thereafter rotates again about 180 degrees to grasp the object a3.

The method of Patent Document 1, as described above, grasps the objects in the order in which the objects are located downstream, without considering the positions of the objects in the width direction of the conveyor 10 and the orientations of the objects. Therefore, movement time of the hand varies widely, and in some instances, the robot may fail to place the objects in a container while the container is passing in front of the robot.

It is conceivable to stop a conveyor for containers, whenever the robot grasps objects. However, this is difficult to adopt in actual production sites, because there are cases where production volume is predetermined within a predetermined time period and conveyance of the containers cannot be stopped due to a relationship with subsequence steps.

Patent Document 1 describes a method in which an area on the conveyor is divided into smaller regions, and grasping is performed in each region to reduce carry distance to a container. However, when the conveyor is wide, dividing the area may have little effect. Furthermore, since the orientations (postures) of the objects are not considered, the robot may grasp an object that has a completely different orientation from an orientation favorable for grasping.

SUMMARY OF THE INVENTION

The present invention aims at providing a carrier device that can minimize a cycle time i.e. the time required for a robot including a hand having the function of grasping some of objects to put the objects in containers.

A carrier device according to an embodiment of the present invention includes a conveyor configured to carry objects supplied continuously; an object detection unit configured to detect the positions and orientations of the objects disposed in a predetermined area on the conveyor; a combination calculation unit, when a robot grasps a plurality of objects, out of the objects, with a hand and places the grasped objects in a container, configured to calculate combinations of sequences to grasp the objects by the hand; an index calculation unit configured to calculate an index for each of the combinations using the distances and rotation amounts between the objects to be grasped by the hand based on the positions and orientations of the objects; and a robot control unit configured to determine the sequences to grasp the objects by the hand based on the indexes, and configured to grasp the objects and placing the objects in the containers in accordance with the determined sequences.

BRIEF DESCRIPTION OF THE DRAWINGS

The objects, features, and advantages of the present invention will become more apparent from the following detailed description of embodiments, along with accompanying drawings. In the accompanying drawings:

FIG. 5 is a block diagram of a carrier device according to a second embodiment of the present invention.

DETAILED DESCRIPTION OF THE INVENTION

A carrier device according to the present invention will be described below with reference to the drawings.

Figure 2:
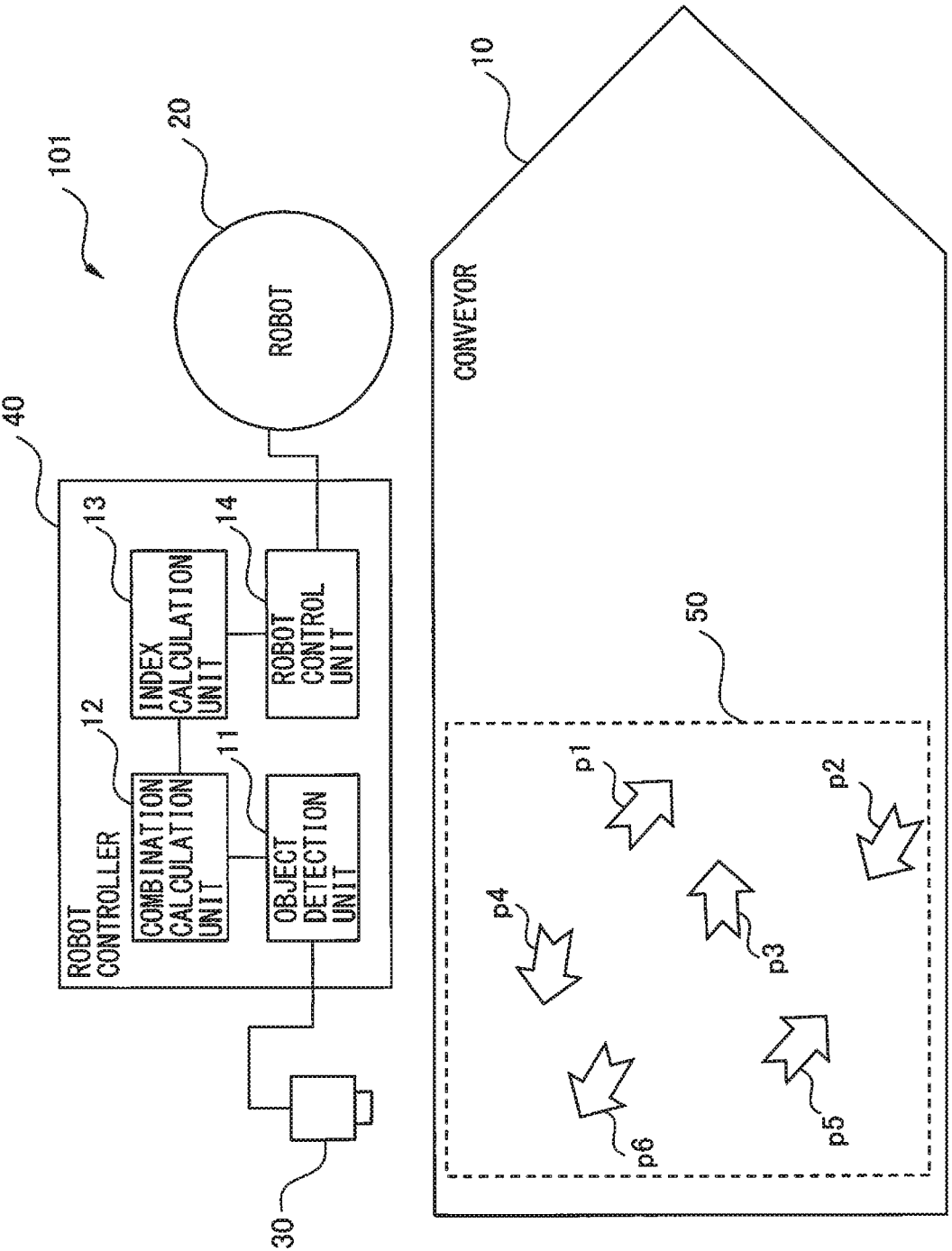
FIG. 2 is a block diagram of a carrier device according to a first embodiment of the present invention.

A carrier device according to a first embodiment of the present invention will be described with reference to the drawings. FIG. 2 is a block diagram of a carrier device 101 according to the first embodiment of the present invention. The carrier device 101 according to the first embodiment of the present invention includes a conveyor 10 for carrying a plurality of objects, a camera 30 for imaging the positions and orientations of the objects, a robot 20 having a hand for grasping the objects, and a robot controller 40 for controlling the robot 20. The robot controller 40 includes an object detection unit 11, a combination calculation unit 12, an index calculation unit 13, and a robot control unit 14.

The conveyor 10 carries the objects supplied continuously. As shown in FIG. 2, objects (p1 to p6) are disposed on the conveyor 10 at random. The objects have random orientations (postures), as indicated by arrows of the objects themselves. In FIG. 2, the conveyor 10 moves from the left to the right at a constant speed.

The camera 30 captures an image of the objects disposed in a predetermined area 50 on the conveyor 10, and transmits the captured image data to the object detection unit 11. The object detection unit 11 detects the positions and orientations of the objects disposed in the predetermined area 50 on the conveyor 10 based on the received image data. In the example of FIG. 2, the number of the objects included in the predetermined area 50 is six, but the number of objects is not limited to this example as long as the number is two or more.

Sequences to grasp the objects that are within the predetermined area 50 of the conveyor 10, as indicated by a dashed line of FIG. 2, are to be determined. In the example of FIG. 2, sequences to grasp the objects (p1 to p6) are to be determined. The predetermined area 50 is preferably set on the conveyor 10 as an area that contains an optimal number of objects based on a trade-off between the time required for calculating an index for every combination of sequences to grasp the objects and the speed of the conveyor to move the objects.

When the robot 20 grasps some of the objects with the hand and places the objects in a container, the combination calculation unit 12 calculates combinations of sequences to grasp the objects. By way of example, the hand has the function of grasping three objects. As a combination of sequences to grasp the objects by the hand, there are conceivable a sequence in which the hand firstly grasps the objects p1 to p3 in this order and places the objects in a container, and a sequence in which the hand secondly grasps the objects p4 to p6 in this order and places the objects in another container. These sequences constitute a first combination. As another combination, there is conceivable a sequence in which the hand firstly grasps the objects p1, p4 and p6 in this order and places the objects in a container, and a sequence in which the hand secondly grasps the objects p5, p3 and p2 in this order and places the objects in another container. These sequences constitute a second combination. Thus, the combination calculation unit 12 calculates what sequences every combination has. Calculation results are preferably stored in a memory (not shown) provided in the combination calculation unit 12. In this manner, the combination calculation unit 12 calculates combinations of sequences in which all the objects contained in the predetermined area are grasped three by three.

The index calculation unit 13 calculates an index of each combination calculated by the combination calculation unit 12, using the distances and rotation amounts between the objects to be grasped by the hand based on the positions and orientations of objects.

Note that, after the hand has grasped one object, the hand rotates while moving to a different position to grasp another object. In other words, after the hand has grasped one object, the hand moves while rotating so as to have a suitable angle for grasping the next object.

Next, a method for calculating an index will be described. The case of the above-described first combination is taken as an example. An index $R_1$ of the first combination is the sum of an index $R_{11}$ of the first grasp and an index $R_{12}$ of the second grasp.

In the first combination, the objects p1 to p3 are firstly grasped in this order. As to the distances between the objects, when $d_{12}$ represents the distance between the objects p1 and p2 and $d_{23}$ represents the distance between the objects p2 and p3, the sum of the distances between the objects is ($d_{12}+d_{23}$). The distance between objects is the distance between the centers of the two objects.

Next, the rotation amounts between objects are calculated. The "rotation amount" refers to the angle of the hand to be rotated, after the hand has grasped one object, to grasp the next object, when the multiple-fingered hand grasps the objects. In other words, the difference between the angle of one object grasped before and the angle of another object grasped after is calculated as the rotation amount. The difference in angle between the objects p1 and p2 is a rotation amount indicated by $\theta_{12}$. The difference in angle between the objects p2 and p3 is a rotation amount indicated by $\theta_{23}$. In this case, the sum of the rotation amounts is ($\theta_{12}+\theta_{23}$).

The index calculation unit 13 preferably calculates an index with application of weights to the distances and rotation amounts between the objects. Thus, using predetermined coefficients $\alpha$ and $\theta$, $R_{11}$ is represented by the following equation (1).

$$R_{11}=\alpha(d_{12}+d_{23})+\theta(\theta_{12}+\theta_{23}) \tag{1}$$

In the same manner, the index $R_{12}$ of the second grasp is calculated by the following equation (2).

$$R_{12}=\alpha(d_{45}+d_{56})+\theta(\theta_{45}+\theta_{56}) \tag{2}$$

Therefore, the index $R_1$ of the first combination is calculated as $R_{11}+R_{12}$. In the same manner, the index calculation unit 13 calculates an index of every combination to grasp the objects.

In this case, the calculation of the indexes is preferably completed until the time when the robot 20 starts grasping the objects (p1 to p6). Thus, the camera 30 is preferably located upstream of the conveyor 10 from the robot 20.

The purpose of the present invention is to minimize a cycle time that is the time required to take out the objects disposed in the predetermined area 50. Therefore, the weights are preferably determined so as to minimize the time to put the objects in the containers. Therefore, the distances and rotation amounts between the objects may be calculated in every sequence to take out the objects, and the weights $\alpha$ and $\theta$ may be determined from measured cycle times. The robot 20 preferably has a timer for measuring the cycle times.

Dividing the distance between the objects by the movement speed of the hand results in the time required for the hand to move. Dividing the rotation amount between the objects by the rotation speed of the hand results in the time required for the hand to rotate. It is also conceivable to calculate an index, assuming that the distances between the objects and the weights for orientations are constant. However, a wrist axis of the robot may rotate slower than the other axes. In such a case, since the rotation amount of the hand is a major factor to determine the cycle time, the orientations (rotation amounts) are preferably weighted more heavily than the distances between the objects.

The robot control unit 14 determines sequences by which the robot 20 grasps the objects with the hand, based on the indexes, and grasps the objects and places the objects in containers in accordance with the determined sequences.

It is basically preferable that all the objects disposed in the predetermined area 50 are grasped and placed in the containers. However, for example, when only one of the objects is left in the conveyor at the end, after the other objects have been grasped by the hand that grasps multiple objects, not grasping the last object intendedly may facilitate increasing efficiency. Thus, the combination calculation unit 12 may calculate combinations of sequences to grasp the objects, with the exception of at least one of the objects. In this manner, a state of "leaving" may be intendedly generated in order to minimize the cycle time i.e. the time required to put the objects in the containers. In such a case, the state of "leaving" is intendedly generated, and the not grasped object may be circulated so as to be grasped with other objects.

Figure 3:
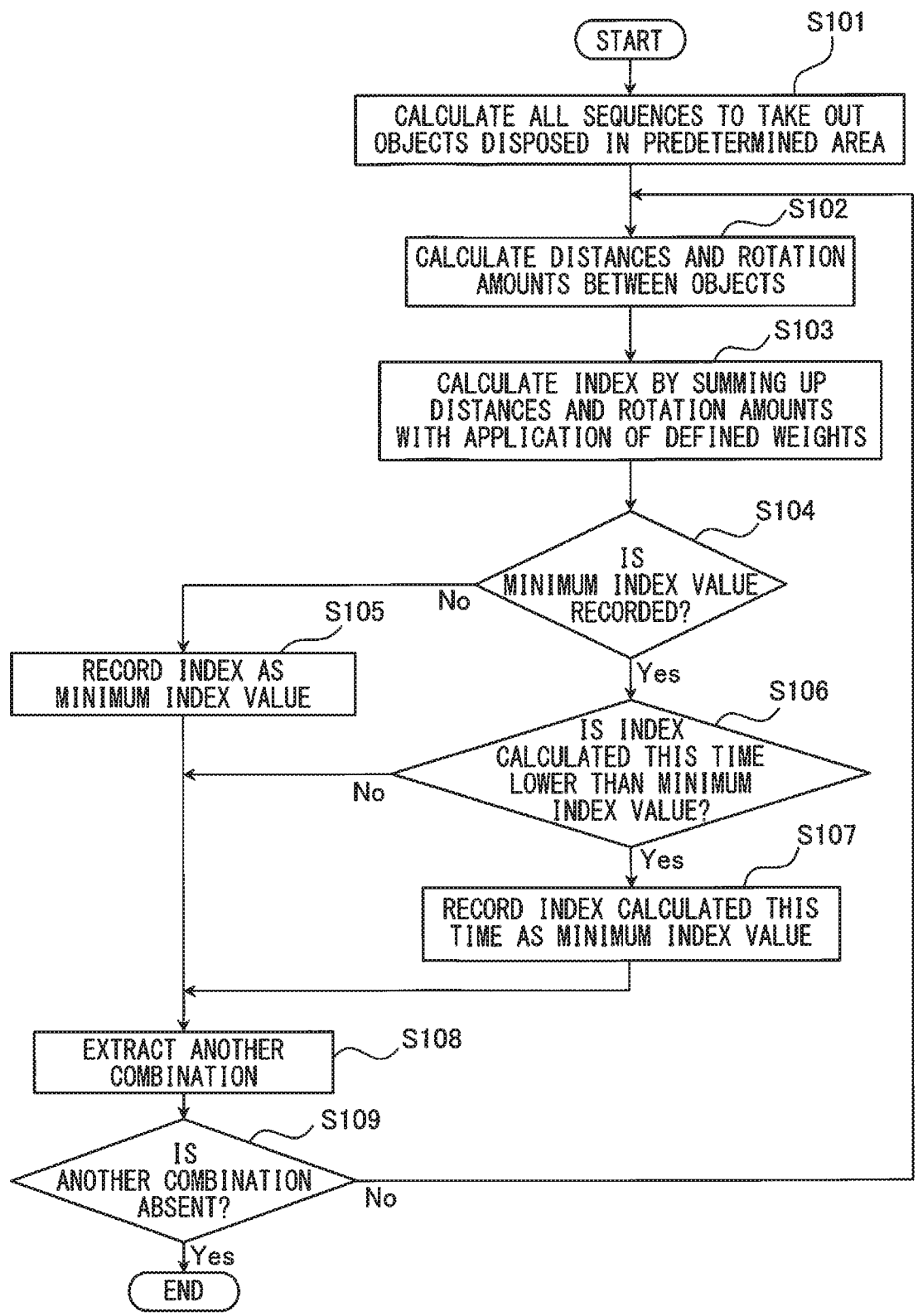
FIG. 3 is a flowchart of a method for calculating an index to determine sequences to grasp objects in the carrier device according to the first embodiment of the present invention.

Next, the operation of the robot grasping objects in the carrier device according to the first embodiment will be described with reference to a flowchart of FIG. 3. First, in step S101, the combination calculation unit 12 calculates all sequences to take out objects disposed in a predetermined area. The combination calculation unit 12 provides the calculation result to the index calculation unit 13.

Next, in step S102, the index calculation unit 13 calculates the distances and rotation amounts between the objects, in each of the sequences to take out all the objects disposed in the predetermined area. Next, in step S103, the index calculation unit 13 calculates an index by summing up the distances and rotation amounts between the objects with application of defined weights thereto.

Next, in step S104, the index calculation unit 13 determines whether or not a minimum index value is recorded. When the minimum index value is recorded, the index calculation unit 13 determines whether or not the index calculated this time is lower than the minimum index value in step S106. On the other hand, when the minimum index value is not recorded, the index calculation unit 13 records the index calculated this time as a minimum index value in step S105, and extracts another combination in step S108.

In step S106, when the index calculated this time is lower than the minimum index value, the index calculation unit 13 records the index calculated this time as a minimum index value in step S107, and extracts another combination in step S108. On the other hand, when the index calculated this time is equal to or higher than the minimum index value, another combination is extracted in step S108.

Next, in step S109, the index calculation unit 13 determines the presence or absence of another combination. When the index calculation unit 13 determines that another combination is present, the operation returns to step S102 to calculate an index for the next combination.

On the other hand, when the index calculation unit 13 determines that another combination is absent in step S109, the calculation of the indexes has been completed for all combinations and a combination having the minimum index has been determined, so that the operation is ended.

Figure 4:
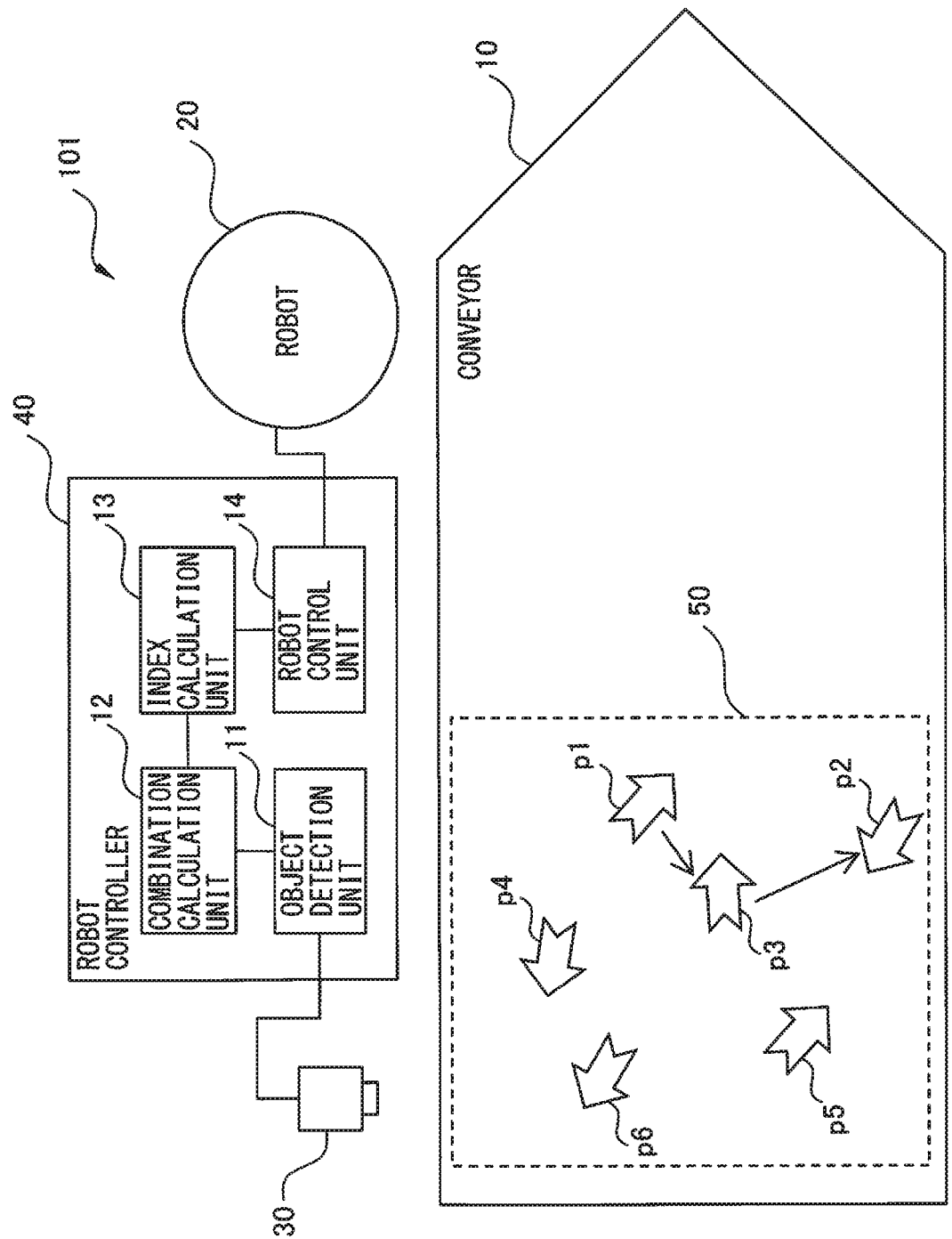
FIG. 4 is a drawing showing a method for grasping of objects disposed on a conveyor with a hand provided in a robot to place the objects in a container, after indexes are calculated in the carrier device according to the first embodiment of the present invention.

FIG. 4 shows a method in which, after a sequence having a minimum index is determined, the robot grasps the objects disposed on the conveyor with the hand provided therein and places the objects in the container. As a result of determining the sequences having the minimum index, as indicated by arrows, the robot 20 firstly grasps the object p1, secondly grasps the object p3, and thirdly grasps the object p2.

Figure 1:
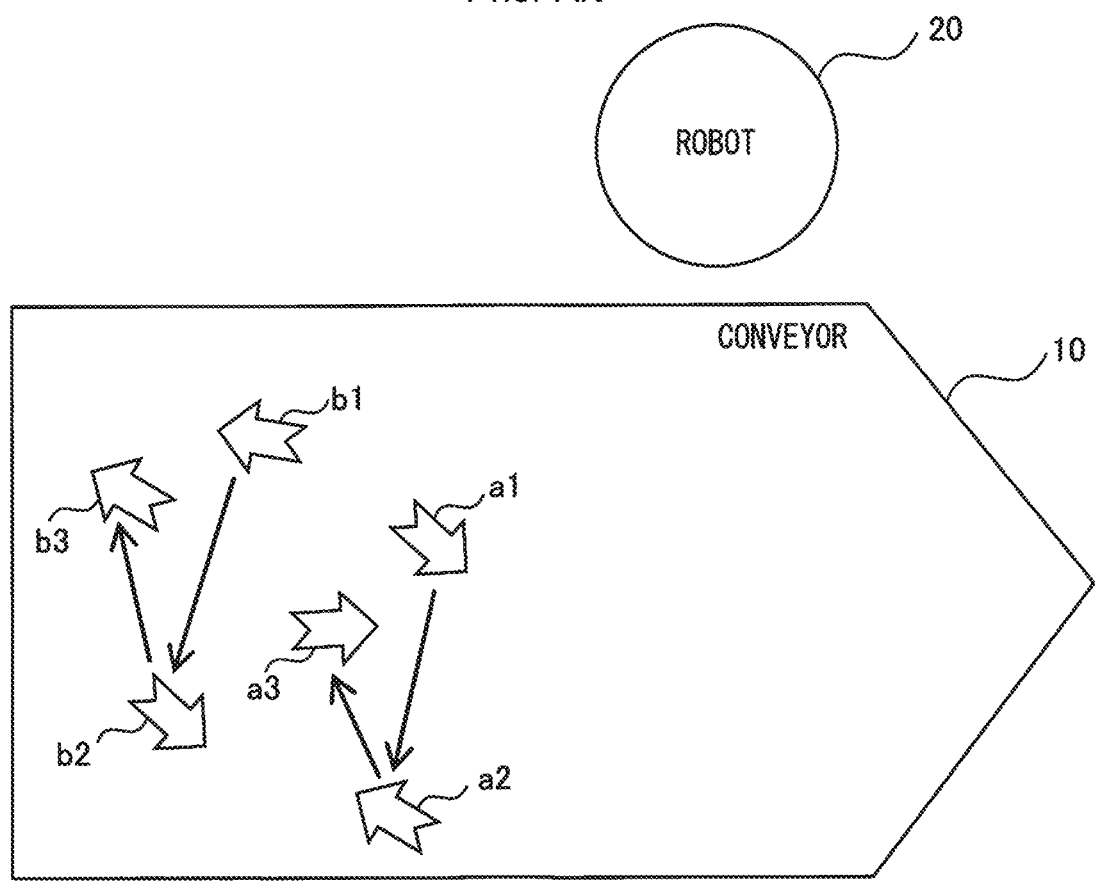
FIG. 1 is a drawing showing a method by conventional art for grasping a plurality of objects disposed on a conveyor with a hand provided in a robot to place the objects in containers.

Grasping the objects in this order reduces the movement distance of the hand to grasp the objects, as compared with the case of FIG. 1 that is an example of conventional art. Thus, the time required to grasp the three objects p1 to p3 is reduced. Therefore, it is possible to reduce the cycle time i.e. the time required to put all the objects in the containers.

The hand grasps the three objects in this embodiment, but not limited thereto, the number of the objects grasped by the hand may be two or four or more. Furthermore, "grasp" includes "suction" by the hand.

According to the present invention, after having grasped the object p1, the hand rotates by a less angle to grasp the object p3 than an angle by which the hand rotates to grasp the object a2, as described in the conventional art. Accordingly, it is possible to reduce the time required to grasp the three objects p1 to p3. Therefore, it is possible to minimize the cycle time i.e. the time required to put all the objects in the containers.

Next, a carrier device according to a second embodiment of the present invention will be described. FIG. 5 is a block diagram of the carrier device according to the second embodiment of the present invention. The difference between a carrier device 102 according to the second embodiment of the present invention and the carrier device 101 according to the first embodiment is that the index calculation unit 13 is connected to the robot control unit 14 through a network 18, and the robot control unit 14 obtains indexes through the network 18. The other configuration of the carrier device 102 according to the second embodiment is the same as that of the carrier device 101 according to the first embodiment, and thus a detailed description thereof is omitted.

The index calculation unit 13 may be installed in a cloud server.

It may be difficult to calculate indexes during high speed operation of the robot, owing to a heavy processing load on a robot controller 41. According to the configuration of the carrier device of the second embodiment of the present invention, indexes are calculated by a device other than the robot controller 41, thus reducing a burden on the robot controller 41.

According to the carrier devices of the embodiments of the present invention, it is possible to minimize the cycle time i.e. the time required to put the objects in the containers using the hand having the function of grasping the objects.

What is claimed is:
1. A carrier device comprising:
   a conveyor configured to carry objects supplied continuously;
   a robot; and
   a robot controller configured to
      detect positions and orientations of the objects disposed in a predetermined area on the conveyor,
      when the robot grasps a plurality of objects, out of the objects, with a hand and places the grasped objects in a container, calculate combinations of sequences to grasp the objects by the hand,
      calculate an index for each of the combinations using distances and rotation amounts between the objects to be grasped by the hand based on the positions and orientations of the objects, determine the sequences to grasp the objects by the hand based on the indexes, and cause the robot to grasp the plurality of objects with the hand and placing the objects in the containers in accordance with the determined sequences.

2. The carrier device according to claim 1, wherein the robot controller is configured to calculate the index with application of weights to the distances and rotation amounts between the objects.

3. The carrier device according to claim 2, wherein the weights are determined so as to minimize time required to put the objects in the containers.

4. The carrier device according to claim 1, wherein the robot controller is configured to calculate the combinations of the sequences to grasp the objects, with an exception of at least one of the objects.

\* \* \* \* \*